US005709777A

United States Patent [19]

Begemann et al.

[11] Patent Number: 5,709,777

[45] Date of Patent: Jan. 20, 1998

[54] DEVICE AND METHOD FOR THE NON-CLOGGING THROTTLING OF A FLUID STREAM OF SUSPENDED MATTER

[75] Inventors: Ulrich Begemann, Leonberg; Helmut Heinzmann, Bömenkirch, both of Germany

[73] Assignee: J.M. Voith GmbH, Germany

[21] Appl. No.: 794,137

[22] Filed: Feb. 3, 1997

Related U.S. Application Data

[63] Continuation of Ser. No. 269,672, Jul. 1, 1994, abandoned.

[30] Foreign Application Priority Data

Jul. 5, 1993 [DE] Germany ........ 43 22 321.4
Jan. 28, 1994 [DE] Germany ........ 44 02 516.5

[51] Int. Cl.[6] ........ D21F 1/06; F15D 1/02; F16K 1/32; F16K 25/02

[52] U.S. Cl. ........ 162/216; 162/336; 162/338

[58] Field of Search ........ 138/46, 45, 44, 138/43, 42; 137/580; 162/210, 253, 336, 338; 251/126

[56] References Cited

U.S. PATENT DOCUMENTS 2,558,356 6/1951 Greene ........ 138/45
2,620,046 2/1952 Bonameau .
3,502,308 3/1970 Simizu .
3,779,863 12/1973 Wahren ........ 162/253
3,846,229 11/1974 Kallmes ........ 162/336
3,894,562 7/1975 Moseley, Jr. et al. ........ 138/44
3,998,244 12/1976 Bentley ........ 138/43
4,200,119 4/1980 Cunningham ........ 137/605
5,284,318 2/1994 Geiger et al. ........ 251/152

*Primary Examiner*—Donald E. Czaja
*Assistant Examiner*—Calvin Padgett
*Attorney, Agent, or Firm*—Ostrolenk, Faber, Gerb & Soffen, LLP

[57] ABSTRACT

The invention relates to a valve or throttling device for a fluid flow, and particularly a flow containing solids, like a flow of pulp suspension. The valve has the following features: A hollow body of substantially rotational symmetry, which is traversed by liquid; the hollow body has a variable passage area which is substantially of rotational symmetry; and a main direction of fluid flow which is substantially axial to the longitudinal axis of the hollow body is provided in the hollow body. A liquid feed to the passage area is provided so that a component of rotation around the direction of the main stream is added to the liquid with reference to the direction of the main stream.

16 Claims, 2 Drawing Sheets

Fig.1
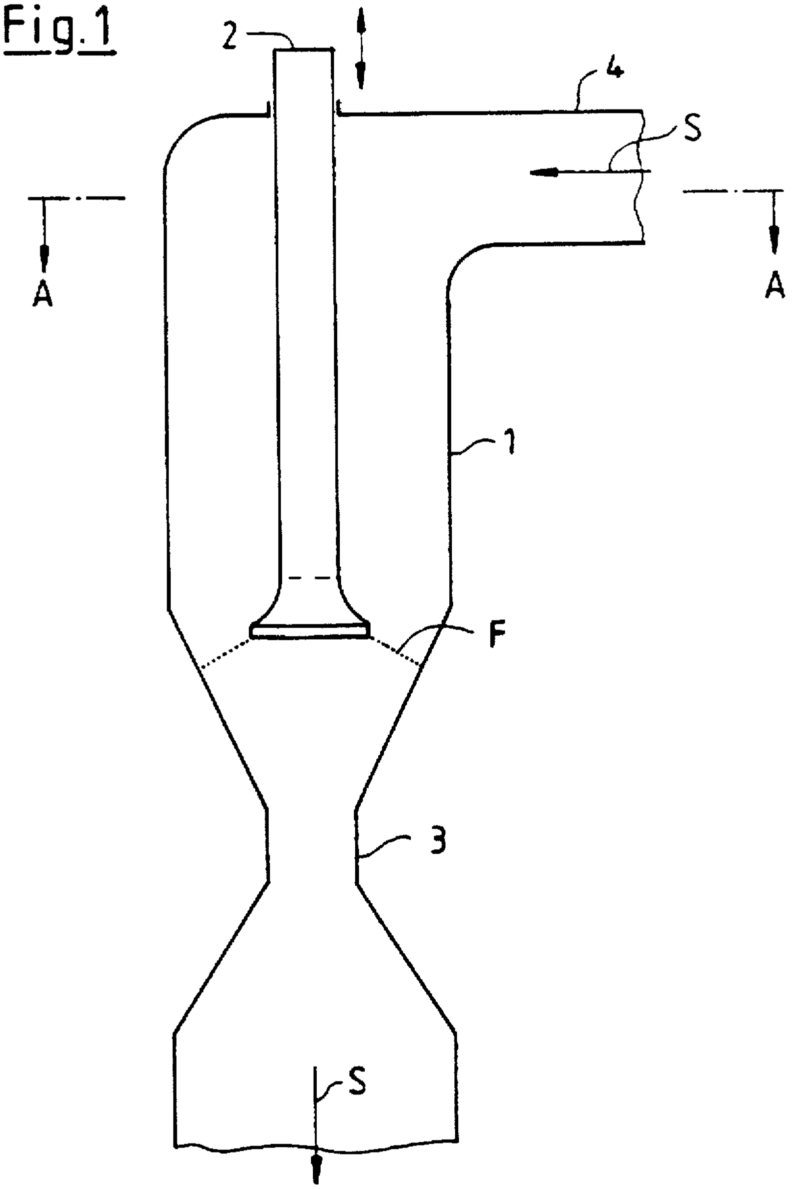
Fig.2 A-A
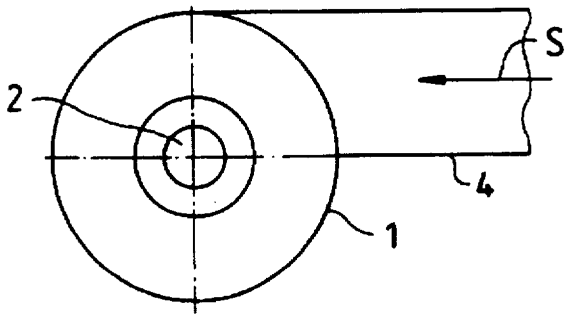

DEVICE AND METHOD FOR THE NON-CLOGGING THROTTLING OF A FLUID STREAM OF SUSPENDED MATTER

This is a continuation of application Ser. No. 08/269,672, filed on Jul. 1, 1994 now abandoned.

BACKGROUND OF THE INVENTION

The present invention relates to a device and a method for the non-clogging throttling of a fluid stream, particularly a stream of suspended pulp in a paper machine or a pulp preparation plant.

Valves of many different types are known in the prior art for throttling fluid streams, including ball valves, flap valves, needle valves, and the like. An essential disadvantage of these valves is that they provide relative narrow cross sections for establishing a desired rate of flow. It is known that narrow cross sections tend to clog in an undesirable manner upon the passage of pulp suspensions and, upon their use in paper making machines, they produce fiber wipings, local accumulations of fibers and deposits. This either results in clogging of the valve or else fiber wipings or deposits are not broken up again before the start of the sheet forming process due to the absence of the influence of shearing forces. As a result, in the most favorable case, formation flows are formed in the paper web. However, experience shows that these non-homogeneous elements in the sheet are frequently the starting point for tearing of the entire web of paper and they thus lead to significant disturbances in the operation of a paper machine.

SUMMARY OF THE INVENTION

The object of the invention is to provide a valve or a throttle member, in which the formation of fiber wipings and/or the danger of clogging is avoided by a suitable design.

The invention concerns a valve or throttling device for a fluid stream, particularly a solid conducting stream, and more particularly a fluid stream of pulp suspension in the headbox of the paper making machine. The valve or throttling device includes a hollow body of substantially rotational symmetry having a longitudinal axis along the direction of liquid flow through the body. The hollow body also includes a variable cross section passage area which is of substantially rotational symmetry. A throttle piece may be provided in the body to define a narrow cross section annular throttle region through which the solid conducting stream passes and where the solid conducting stream might be blocked. Means, e.g. in the form of tangential inlet flow to the hollow body, are provided to impart a rotary component of flow to the liquid being fed into the hollow body and being fed past the throttle area of the body, so that the liquid has a rotary component around the direction of the main stream as the main stream moves through the hollow body to the outlet from the throttle device. Other means may be provided for providing the rotary component to the liquid flow. For example, the inner surfaces of the respective devices are to be provided with e.g. helical grooves, guide vanes etc. which cause rotation of the liquid.

The invention also concerns the method of reducing clogs in a valve or throttling device through imparting the rotary component of motion to the liquid stream passing through the hollow body.

The inventors have recognized that the tendency of a valve toward clogging can be considerably reduced, particularly in a type of valve construction which corresponds to a needle valve, if a rotary component is added to the flow in the region of the narrowest point of the valve. The rotary component breaks up any turbulences which may be present and also the fiber wipings and/or fiber accumulations thereby produced, which might otherwise lead to clogging.

Other features and advantages of the present invention will become apparent from the following description of the invention which refers to the accompanying drawings.

BRIEF DESCRIPTION OF THE DRAWINGS

FIG. 1 is a diagrammatic cross section through a valve in accordance with the invention;

FIG. 2 is a section A—A through the valve of the invention shown in FIG. 1;

DETAILED DESCRIPTION OF EMBODIMENTS OF THE INVENTION

Figure 3:
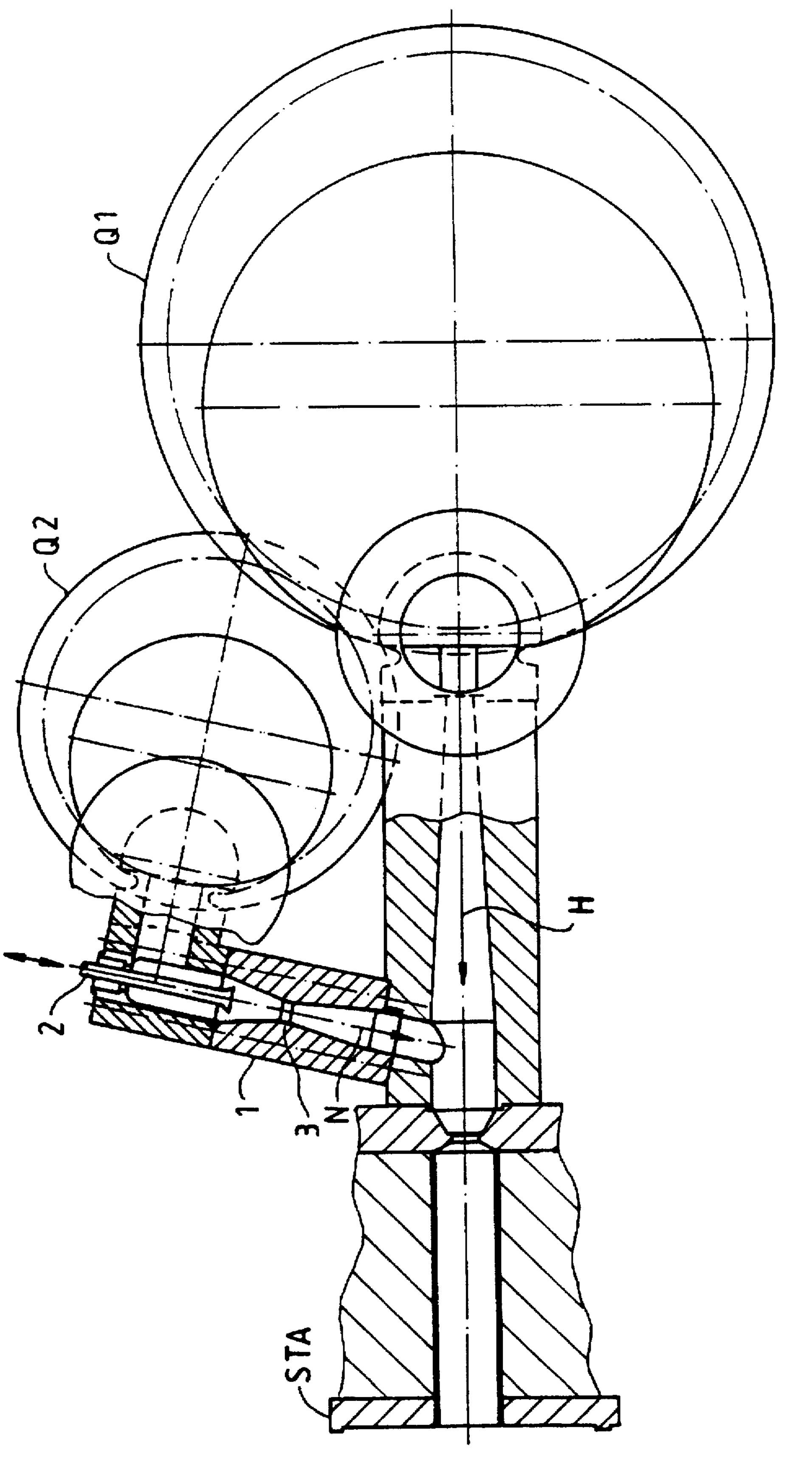
FIG. 3 shows the use of the valve of the invention in the pulp-suspension feed of a headbox.

FIG. 1 is a cross-sectional view of a throttle device 1 in accordance with the invention. In the diagrammatic showing, the throttle device includes a body which defines a cylindrical hollow space of substantially rotational symmetry having a constriction 3. A fluid stream is fed in perpendicular to the axis of the cylindrical hollow space via an eccentrically arranged, radius parallel feed 4. The fluid stream S thus enters the hollow space tangentially and is there deflected toward the axial direction along the hollow space which direction is along the axis of the space. This imparts a spiral course to the stream S within the cylindrical hollow space. Within this hollow space there is also an axially arranged ram 2. It is provided with a widening on its lower side, which is the side facing the throttle or constriction 3. The ram 2 is displaceable in the axial direction so that a narrowed annular restriction in cross section similar to that provided by a needle valve is effected by axial displacement of the ram. In contrast to an ordinary needle valve, however, the tangentially introduced stream sufficiently flushes the narrowed constriction so that no clogging by solids entrained in the flow should occur at this point. This is particularly advantageous in connection with streams of suspended pulp in paper machines in which such clogging, and therefore formations of fiber wipings, can have very unfavorable effects on the quality of the paper produced.

The liquid exits through an outlet at the bottom of the body 1.

FIG. 2 is a cross section A—A through the throttle device of FIG. 1. In the top view shown, the tangential feed of the stream S into the cylindrical inner space of the throttle device is clearly shown.

The invention is not limited to a purely tangential feed of the stream into the throttle space of a throttling device. It is also possible, for instance, to use suitable ball elements to change the direction of the stream fed within the entire solid angle so that, on the one hand, an angle other than 90° with respect to the main axis of the throttling device can be adopted and at the same time the eccentricity of the stream of pulp with respect to the axis of the cylindrical throttling device can be controlled. In this way, simple control of the angle of the rotating flow spiral within the throttling device is possible. As a result, on the one hand, the cleaning effect can be controlled in a desired manner and, on the other hand, an additional increase or reduction of the throttling is possible without the reduced passage area F having to be changed by moving or changing the ram 2.

Furthermore, the fluid wetted surfaces may be surfaces for causing rotation of the liquid. To do this, the inner surfaces of the respective devices are to be provided with e.g. helical grooves, guide vanes etc. which cause rotation of the liquid.

FIG. 3 shows the use of the valve of FIGS. 1 and 2, for example for the controlled feeding of dilution water into the main stream of the pulp suspension in a paper machine headbox. Two cross-flow distributors Q1 and Q2 are shown, the pulp suspension being fed in slightly increased concentration from the cross-flow distributor Q1 via a main line H to the headbox STA.

There are two distributors, each comprising a main pipe, extending in the cross direction of the machine and from open side of the headbox to the other one. Each main pipe is connected to a plurality of small diameter pipes, each of which generally is located in a vertical plane situated perpendicularly on the length axis of the main pipe. The small diameter pipes are arranged one behind the other one, as seen in a side elevational view.

The two-distributor-version comprises two such distributors, with the main pipes being located side by side and parallel to each other, whereby any one of the small diameter pipes of the second distributor is connected to one single one of the small diameter pipes of the first distributor. Normally, the main pipe of the second distributor has a smaller diameter than the main pipe of the first distributor.

On the main line H, a feed of dilution water into the main stream H at an angle other than 90° is shown. The feed consists essentially of the throttle element 1 itself, the throttle element having the same development as the one shown in FIG. 1 and being connected via its feed line directly to the second cross-flow distributor Q2 which conducts the dilution water. By the correct selection of the angle between the main stream H and the secondary stream N fed by the throttling device, the result is obtained that, regardless of the amount of the secondary stream N fed, the sum of the amount of suspension fed to the headbox remains constant. By the development of the throttle device 1, any formation of fiber wiping in the throttle device is avoided, avoiding reduction in the quality of the paper produced. The throttle device 1 is operated in such a manner that, at the normal operating point, an average amount of pulp suspension is fed by the throttle device 1, so that no settling processes of solids in the throttle device are possible. The regulation of the density of the pulp, and therefore of the concentration of the total suspension from streams N and H, then takes place around this central operating point. The sum of the total flow remains constant, and a very sensitively adjusted regulation of the concentration is obtained as a result of the construction of the throttle device 1.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A method for reducing clogging of a valve or throttling device for a paper-making maching having a headbox, wherein the valve or throttling device has a hollow body of substantially rotational symmetry and having a longitudinal axis defining a main direction of fluid flow;

the method comprising the steps of:

moving fluid through the body generally in a direction substantially along the longitudinal axis of the hollow body;

imparting a rotary component to the fluid flow entering the body so that the fluid rotates in the body with respect to the longitudinal axis, and imparting said rotary component of motion to the fluid at least in a region of a throttled cross section in the hollow body, the region of throttled cross section being positioned in the pulp suspension feed to the headbox of the paper-making machine; and permitting the fluid to exit from the hollow body after passing the region of throttled cross section.

2. The method of claim 1, wherein the rotary component is imparted to the fluid flow by supplying the fluid flow tangentially to the hollow body upstream of the throttled cross section.

3. The method of claim 2, wherein the rotary component is imparted to the fluid flow by introducing the fluid into the hollow body at an inlet disposed eccentrically and substantially perpendicularly to the longitudinal axis of the hollow body.

4. A method for reducing clogging at a region of narrowed cross-section of a throttle device in a fluid line conveying a fluid flow to a headbox in a papermaking machine, the throttle device having a longitudinal axis and adapted for a main fluid flow in a direction of the longitudinal axis, the method comprising the step of:

imparting at least in the vicinity of the region of narrowed cross-section a rotational component to the fluid flow which is rotational about the direction of the main fluid flow, for reducing clogging of the throttle device by an accumulation of any suspensions in the fluid flow.

5. The method of claim 4, wherein the imparting step comprises feeding the fluid flow in the throttle device in a direction tangential to the longitudinal axis.

6. The method of claim 4 wherein fibers are suspended in the fluid flow, and the fluid is fed far avoiding fiber accumulation in the throttle device.

7. A device for throttling a fluid stream containing solids in a paper-making machine having a headbox, the device comprising:

a hollow body of substantially rotational symmetry and having a longitudinal axis, the body being traversed in the direction of the longitudinal axis by fluid and, the longitudinal axis defining a main direction of fluid flow;

the hollow body having a variable passage cross section which is of substantially rotational symmetry;

means feeding fluid to the passage area and for directing the fluid fed so that in addition to traveling substantially along the longitudinal axis of the hollow body, the fluid has a rotary component around the main direction of fluid flow through the hollow body; and the body having an outlet for the fluid;

the device being positioned in the pulp suspension feed to the headbox of the paper-making machine.

8. The throttling device of claim 7, wherein the means for directing a rotary component to the fluid comprises the means feeding fluid to the throttling device communicating into the hollow body generally tangentially to the body of rotational symmetry which is generally cylindrically shaped.

9. The throttling device of claim 7, including fluid wetted surfaces therein shaped and positioned for causing rotation of the fluid around the hollow body.

10. The throttling device of claim 7, further comprising a throttle element in the hollow body for defining a narrowed cross section annular space in the hollow body between the throttle element and the hollow body around the throttle element.

11. The throttling device of claim 10, wherein the body of rotational symmetry has a constriction in its cross section downstream in the main direction of fluid flow of the throttle element in the body.

12. A throttle device for use in a fluid line conveying a fluid flow to a headbox in a papermaking machine, the throttle device comprising:

a substantially rotationally symmetric hollow body having a longitudinal axis and adapted for main fluid flow in a direction along the longitudinal axis, the hollow body having a region of narrowed cross-section;

means for imparting at least in the vicinity of the region of narrowed cross-section a rotational component to the fluid flow which is rotational about the direction of the main fluid flow, for avoiding obstructions by an accumulation of any suspensions in the fluid flow at the region of narrowed cross-section.

13. The throttle device of claim 12, wherein the hollow body has a fluid flow passage of variable cross-section which is substantially rotationally symmetric.

14. The throttle device of claim 12, wherein the imparting means includes means for feeding fluid to the throttle device in a direction tangential to the main fluid flow.

15. The throttle device of claim 12, wherein the imparting means comprises inner surfaces of the hollow body adapted to contact the fluid flow therepast, the inner surfaces being configured to impart a rotational component to the fluid flow past the inner surfaces.

16. A throttle device for use in a fluid line conveying a fluid flow to a headbox in a papermaking machine, the throttle device comprising:

a substantially rotationally symmetric hollow body having a longitudinal axis and adapted for a main fluid flow in a direction along the longitudinal axis, the hollow body having a region of narrowed cross-section;

a fluid flow device imparting at least in the vicinity of the region of narrowed cross-section a rotational component to the fluid flow which is rotational about the direction of the main fluid flow, for avoiding obstructions by an accumulation of any suspensions in the fluid flow at the region of narrowed cross-section.

* * * * *